Oct. 21, 1969   A. BINDERNAGEL ET AL   3,473,574
CLAMPING MEANS FOR SEALING AND CLAMPING HEADS
Filed Feb. 10, 1967   3 Sheets-Sheet 1

INVENTORS
Ali Bindernagel,
Horst Luebke and
Erwin Kost
BY

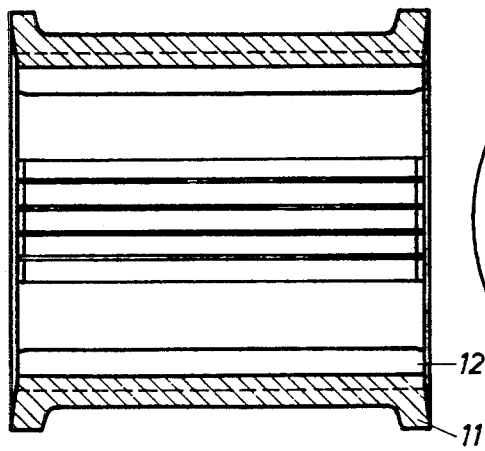
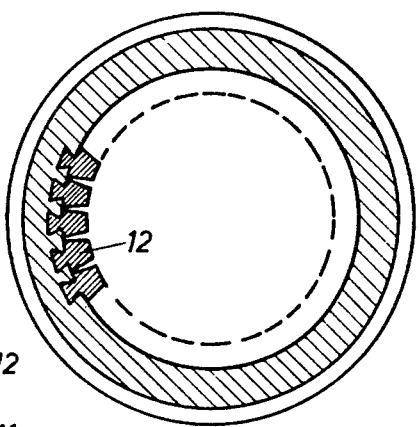
Fig. 3    Fig. 4
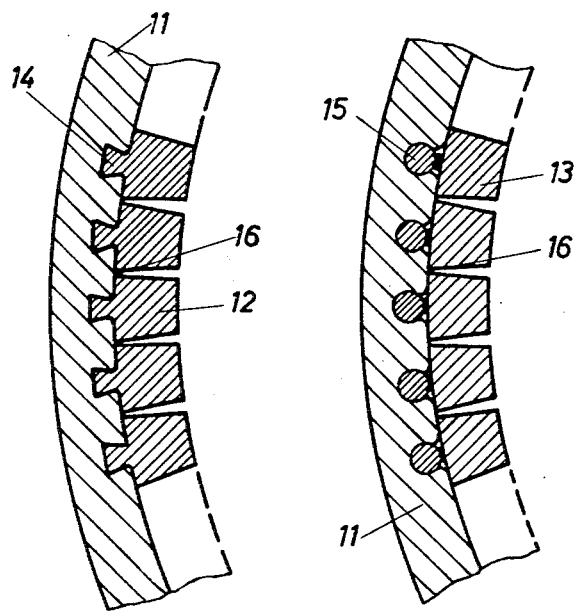
Fig. 4a    Fig. 4b

Oct. 21, 1969    A. BINDERNAGEL ET AL    3,473,574
CLAMPING MEANS FOR SEALING AND CLAMPING HEADS
Filed Feb. 10, 1967    3 Sheets-Sheet 3

INVENTORS
Ali Bindernagel,
Horst Luebke and
Erwin Kost
BY

United States Patent Office 3,473,574
Patented Oct. 21, 1969

3,473,574
CLAMPING MEANS FOR SEALING AND
CLAMPING HEADS
Ali Bindernagel, Dusseldorf-Gerresheim, Horst Luebke,
Hilden, Rhineland, and Erwin Kost, Osterath, Rhineland, Germany, assignors to Kommanditgesellschaft
Friedrich Kocks, Dusseldorf, Germany, a corporation of
Germany
Filed Feb. 10, 1967, Ser. No. 615,097
Int. Cl. F16l 55/12
U.S. Cl. 138—109    5 Claims

ABSTRACT OF THE DISCLOSURE

This invention relates to clamping means for sealing and clamping heads used on devices for pressure testing tubes and similar hollow bodies. The invention provides a cylindrical sealing collar and a resilient cylindrical clamping member arranged at the inner circumference of the sealing collar and made of harder material than the material of the collar, the clamping member being made up of a plurality of bars of either rectangular or trapezoidal cross-section and separated by a slot and being capable of being pressed one against the other by spring force.

---

This invention relates to clamping means for sealing and clamping heads and particularly to devices for testing tubes and hollow bodies similar to tubes by pressure-testing with the aid of a filled in pressure means. In particular, the invention relates to sealing and clamping heads which are put on an open end of the hollow body to be tested whech is tightly closed on all sides. These sealing and clamping heads shut the hollow body against the testing pressure and are held on it against this pressure. The pressure means is fed through them to the hollow body to be tested. Known sealing and clamping heads of this type consist of a multipart housing in which an open end of the hollow body can be introduced from one side and the pressure means from the other side, and in which are provided a ring sealing the introduced end of the hollow body against the housing as well as a clamping means radially adjustable to the circumference of the hollow body; both of which are exposed to the pressure of the pressure means.

In case of sealing and clamping heads corresponding to a previous patent application of the applicants entitled "Sealing and Clamping Head for an End of a Tube to Be Pressure Tested," Ser. No. 425,531, filed Jan. 14, 1965, the clamping means separated from the sealing ring consists of a sealing collar directly exposed to the pressure means and made of high resilient material, e.g., rubber, and a clamping part enclosed by this collar and made of a more solid material as against the collar material, preferably of metal, and participating in the radial motions of the sealing collar. This clamping part comprises a case or sleeve provided with overlapping slit-like cuts alternately emanating from its both ends. This clamping sleeve has a disadvantage insofar as it can be pressed together in circumferential direction only by half the sum of the width of the longitudinal slots. In case of given slot width, the number of slots must be twice as it would be necessary for the diminution of diameter necessary in operation.

Since the slot widths must be as small as possible already in the non-stressed sleeve and must not exceed a size dependent upon the pressure means pressure, the material of the sealing collar and the thickness of the collar, the minimum number of slots becomes extremely great so that the manufacture of such sleeves slotted alternately from both ends is difficult and expensive. Since in addition to this the width of the slot cannot be selected as small as desired, the selection of the materials of the sealing collar, that is its resiliency and the wall thickness of the over sealing collars, is not unlimited in case of given pressure means over pressure so that the clamping means must be made eventually more rigid than desirable.

Consequently, an undesired great pressure means pressure must be exerted on the sealing collar for compressing the clamping means before the clamping means responds and grips the body to be clamped. This can eventually entail that the clamping head can be pushed off the work piece by the axial pressure of the pressure means, that is that the work piece is pushed out of the clamping head.

For enabling a fast response of the clamping means, the pressure means could be fed prior to feeding the testing means into the body to be tested through a special facility comprising lines, valves and control devices to the clamping means, this resulting, however, in greater expense apart from an increase in the number of the parts to be moved and to be controlled.

In another patent application of the applicants entitled "Sealing and Clamping Heads," Ser. No. 625,730, filed Dec. 14, 1967, bars are used embedded one apart from the other by a certain distance in the annular body of resilient material. It became, however, evident that according to the extent of the deformation of the annular body, certain parts of the sealing collar, especially those between the bars, are destroyed after longer or shorter use and that the bars loosen.

The present invention provides a structure in which the clamping parts of the clamping means are formed from a quantity of bars of rectangular or trapezoid cross section and separated one from the other by slots. These bars can be pressed one to the other by spring power. They participate in the radial and tangential motions of the collar keeping equal distances apart. These bars can either be cast when manufacturing the sealing cover to its inner surface or be fixed to it subsequently. In both cases it has been proved expedient for maintaining the distances between the individual bars to put between them elastic or resilient linings so that it is in addition to this avoided that the poured material penetrates into the slot when the bars are being cast on.

Linings of plastic foam have been proved suitable in this connection since they permit very great elastical deformations and are in totally compressed condition of a very slight thickness only as compared with their initial thickness.

The bars can be supported according to another feature of the invention in longitudinal slots on the inner side of the sealing collars in which they engage with ledgelike shoulders accordingly shaped. This embodiment has the advantage that the sealing collar is when exposed to pressing and stretching not impeded by the rigid bars to displace in circumferential direction relative to these bars, and it is consequently less stressed.

This advantage is even more distinctive in case of another embodiment of the clamping means providing according to the invention rectangular or trapezoid bars supported at the inner side of the sealing collar by tangentially acting laminated springs arranged between them without being connected with same otherwise. Owing to tangentially acting springs and the radial power caused by it, this arrangement is acting as a resilient sleeve pressing against the inner wall of the sealing collar. For facilitating the assembly and eventually for increasing the radial pressing powers in the non-loaded condition, radially acting ring springs can be provided which are arranged countersunk in the inner area of the clamping part formed by bars.

As in this embodiment, the bars and laminated springs can be easily made very thin, it is possible to arrange on the circumference of the clamping means as many bars and laminated springs as it is necessary for insuring minimum slots.

The drawings show various embodiments of the clamping means according to the invention comprising a sealing collar and a clamping part formed by individual bars.

FIGURE 3 shows a longitudinal section through another embodiment of the clamping means, in which the bars engage with ledge-like shoulders in the longitudinal grooves at the inner side of the sealing collar.

FIGURE 4 shows a section of the clamping part as per FIGURE 3.

FIGURE 4a shows an enlarged partial section of the clamping means as per FIGURES 3 and 4 comprising bars, the supporting ledges of which have a dovetailed cross section.

FIGURE 4b shows an enlarged partial section of the clamping means, the bars of which are provided with holding ledges of circular section.

Figure 1:
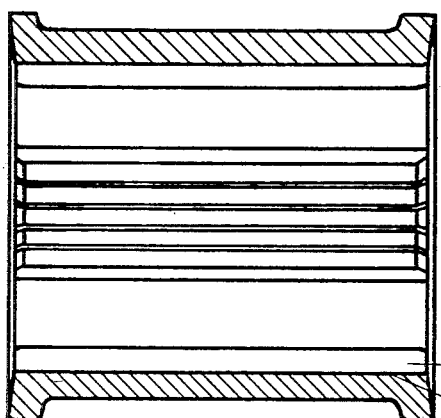
FIGURE 1 shows a longitudinal section through a clamping means, the clamping part of which comprises individual bars, which are provided at the inner area by casting on or gluing together and in which strips of foam rubber are put between the bars.
Figure 1A:
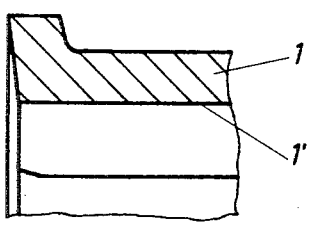
FIGURE 1a shows an enlarged section of FIGURE 1.
Figure 2A:
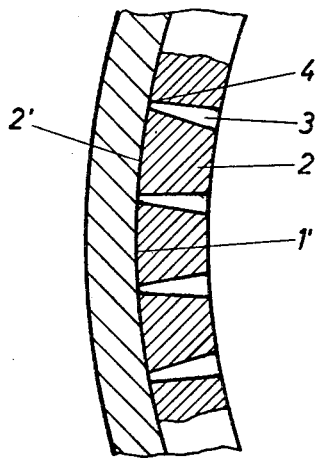
FIGURE 2a shows an enlarged section of FIGURE 2.

The clamping means of FIGURES 1, 1a; 2, 2a comprises the sealing collar 1 and the bar-like clamping parts 2, which may have a rectangular or trapezoid section and which are made of a material having a greater hardness and strength than the material of the sealing collar.

Foam rubber strips are inserted between the bars for securing their distances and in case of cast-on bars also for avoiding that the pouring material penetrates into the slot. The bars 2 are tightly cast on or glued on at a longitudinal area 2' with the inner area 1' of the sealing collar, whereas as per FIGURES 3, 3a; 4, 4a the bars 12 and 13 are provided with ledge-like shoulders 14 and 15 having a dovetailed or round section engaging at the inner side of the sealing collar in grooves 14 and 15 accordingly shaped in the shoulder sections.

Figure 2:
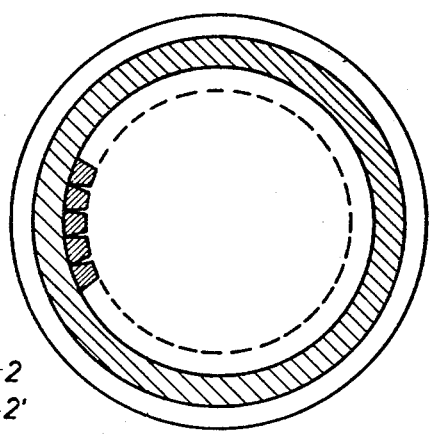
FIGURE 2 shows a front view of the clamping means of FIGURE 1 partly in section.

As may be seen easily, the embodiment as per FIGURES 1 and 2 enables as in case of that as per FIGURES 3 and 4 that the dimensions of the bars in the direction of circumference can be made almost as small as desired, and consequently their number as well as the number of the slots 4 and 16 can be accordingly large and thus the width of this slot extremely small.

Figure 5:
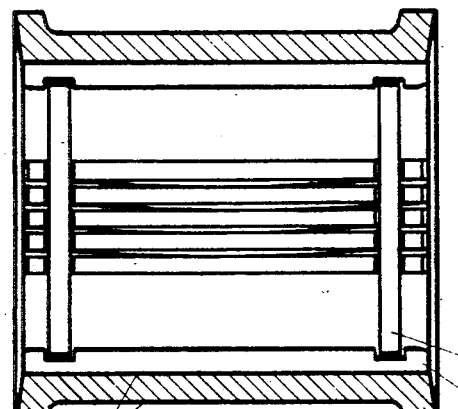
FIGURE 5 shows a longitudinal section through a clamping means, the clamping part of which consists of bars with intermediate laminated springs secured in their position by two ring springs.
Figure 6:
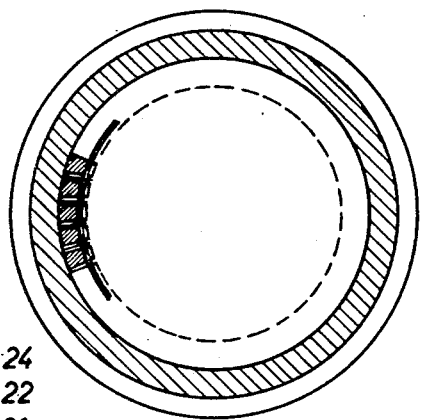
FIGURE 6 shows a section through the clamping means as per FIGURE 5.
Figure 5A:
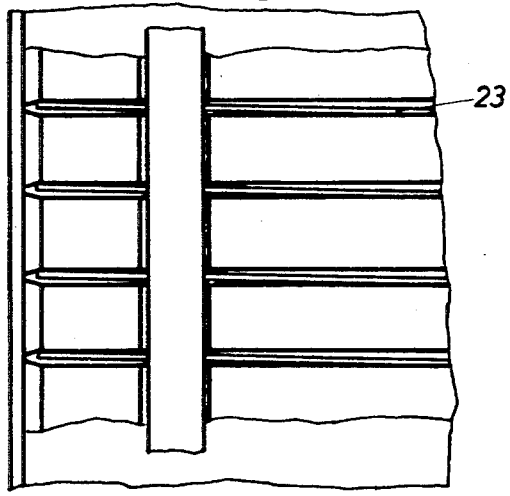
FIGURE 5a shows an enlarged section from FIGURE 5.
Figure 6A:
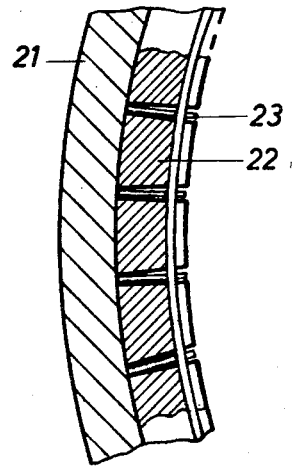
FIGURE 6a shows an enlarged section of FIGURE 6.

The bars 22 shown in the FIGURES 5, 5a; 6, 6a and 7 are not tightly connected with the sealing collar 21, but are leaning only at the inner surface of the sealing collar 21 and are pressed radially to the outside and thus to the sealing collar 21 by the tangential force produced by the laminated springs 23. The laminated springs 23 are in the embodiment as per FIGURE 7 of the same height as the bars 22 and are provided like same with certain grooves 25 for the ring springs 24.

Figures 7, 8:
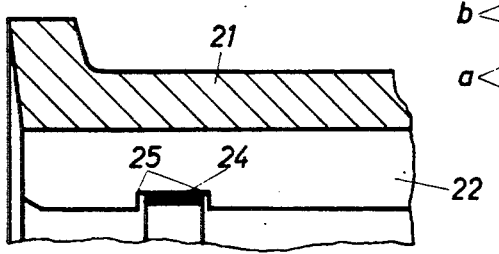
FIGURE 7 shows a segmental view of an end of a laminated spring comprising a groove for the ring spring.
FIGURE 8 shows a segmental view of an end of a small laminated spring without groove.

In case of the embodiment as per FIGURE 8, the height $b$ of the laminated springs 23a is inferior to the height of the bars 22 at least by the thickness of the ring springs 24. Consequently, the springs 23a are not provided with grooves. Thus the springs are not in contact with the work piece to be clamped. The laminated springs 23a have the advantage of simpler and less expensive manufacture. Since the fixation of the bars 22 on or in the sealing collar may not be considered in case of an embodiment of the clamping part as per FIGURES 5 to 8, the medium bar thicknesses can be very small, the number of bars very high and consequently the slot width especially small so that also the wall thicknesses of the sealing collar and eventually the modulus of elasticity of the material of the sealing collar can be small and thus the elasticity of the clamping means great enabling the clamping means provided with such clamping parts to grip reliably when they are actuated by the testing means pressure at the same time as the work piece to be tested.

The invention relates also to a clamping means comprising exclusively bar-like elements being resilient in circumferential direction. There can, however, occur disadvantages when the springs being under clamping pressure are not lying tightly one upon the other and are stressed to deflection because of their axial load. They can eventually buckle in circumferential direction, the clamping force transferred by them thus being adversely influenced.

We claim:

1. Clamping means for sealing and clamping heads at devices for pressure-testing of tubes and hollow bodies similar to tubes comprising a cylindrical sealing collar and a resilient cylindrical clamping part arranged at the inner circumference of which, made of a harder, more solid material as compared with the material of the collar characterized in that the clamping part comprises a number of bars having one of a quadrilateral cross-section and separated apart by a slot which can be pressed one against the other against spring force.

2. Clamping means according to claim 1 characterized in that the bars are connected with the inner surface of the sealing collar adhering on the collar material.

3. Clamping means according to claim 1 characterized in that the bars engage with ledge-like shoulders provided at a longitudinal side in grooves provided at the inner circumferential area of the sealing collar.

4. Clamping means as per claim 1 characterized in that the bars are held against the inner circumferential area of the sealing collar by laminated springs in the slot.

5. Clamping means according to claim 4 characterized in that the bars and the laminated springs are secured in their position by at least one ring spring countersunk in the inner surface constituted by the bars.

References Cited

UNITED STATES PATENTS

| | | | |
|---|---|---|---|
| 2,214,491 | 9/1940 | Tondeur | 138—109 |
| 2,583,316 | 1/1952 | Bannister | 138—97 |
| 3,381,715 | 5/1968 | Michael | 138—109 |

PATRICK D. LAWSON, Primary Examiner